United States Patent
Morikami et al.

(10) Patent No.: US 11,670,093 B2
(45) Date of Patent: Jun. 6, 2023

(54) VEHICLE EXTERNAL ENVIRONMENT RECOGNITION APPARATUS

(71) Applicant: SUBARU CORPORATION, Tokyo (JP)

(72) Inventors: Yasuyuki Morikami, Tokyo (JP); Yuki Katsuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 119 days.

(21) Appl. No.: 17/406,479

(22) Filed: Aug. 19, 2021

(65) Prior Publication Data
US 2022/0058404 A1   Feb. 24, 2022

(30) Foreign Application Priority Data
Aug. 20, 2020 (JP) .............................. JP2020-139344

(51) Int. Cl.
*G06V 20/58* (2022.01)

(52) U.S. Cl.
CPC ........ *G06V 20/584* (2022.01); *G06V 2201/08* (2022.01)

(58) Field of Classification Search
CPC .. G06V 20/584; G06V 2201/08; G06V 20/58; G06V 40/161; G06V 40/168; G06V 40/18; G06V 20/56; G06V 10/82; G06V 40/103; G06V 10/50; G06V 10/764; G06V 20/44; G06V 20/54; G06V 20/582; G06V 20/588; G06V 40/20; G06V 40/10; G06V 10/147; G06V 2201/07; G06V 10/10; G06V 10/143; G06V 20/52; G06V 10/811; G06V 20/00; G06V 20/64; G06V 10/24;
(Continued)

(56) References Cited

U.S. PATENT DOCUMENTS

2004/0021853 A1* 2/2004 Stam .................... B60Q 1/1423
356/218
2010/0214791 A1* 8/2010 Schofield ............. G06V 20/588
362/466
(Continued)

FOREIGN PATENT DOCUMENTS

JP 3349060 B2 11/2002
JP 3872179 B2 1/2007

*Primary Examiner* — Nimesh Patel
(74) *Attorney, Agent, or Firm* — McDermott Will & Emery LLP

(57) ABSTRACT

A vehicle external environment recognition apparatus includes a light source extraction processor, a light source pair identification processor, a degree of reliability derivation processor, a light source pair re-identification processor, and a vehicle identification processor. The light source pair identification processor identifies a first pair of light sources based on positional relation of extracted light sources. The degree of reliability derivation processor derives a degree of vehicle reliability of the first pair of light sources. The degree of vehicle reliability indicates how reliably the first pair of light sources is regarded as belonging to the identical vehicle. When the degree of vehicle reliability of the first pair of light sources is lower than a re-identification threshold, the light source pair re-identification processor identifies a second pair of light sources in the vicinity of the first pair of light sources having the degree of vehicle reliability lower than the re-identification threshold.

3 Claims, 6 Drawing Sheets

(58) Field of Classification Search
CPC ........ G06V 10/60; G06V 20/10; G06V 20/48; G06V 20/586; G06V 40/1359; G06V 40/15; G06V 40/45; G06V 10/12; G06V 10/242; G06V 10/255; G06V 10/42; G06V 10/70; G06V 10/88; G06V 30/19173; G06V 30/194; G06V 40/1365; G06V 40/19; B61L 13/00; B61L 15/0072; B60Q 1/50; B60Q 1/503; B60Q 1/525; B60Q 9/00; B60Q 9/008; B60Q 1/14; B60Q 1/1423; B60Q 1/324; B60Q 2300/054; B60R 21/0134; B60R 1/00; B60R 21/013; B60R 21/01538; B60R 2300/106; B60R 2300/107; B60R 2300/301; B60R 2300/302; B60R 1/003; B60R 1/04; B60R 11/04; B60R 2300/105; B60R 2300/205; B60R 2300/8066; B60R 2300/8093; B60R 2001/1253; B60R 21/01534; B60R 21/01536; B60R 25/25; B60R 2021/0006; B60R 2022/208; B60R 21/0153; B60R 2021/0004; B60R 2001/1223; B60R 2021/0018; B60R 2021/0027; B60R 21/0132; B60R 21/0136; B60R 21/015; B60R 21/203; B60R 2300/406; B60R 2300/108; B60R 2300/207; B60R 2300/305; B60R 2300/8033; B60R 2300/806; B60R 2300/8086; G06T 2207/20084; G06T 7/20; G06T 1/20; G06T 7/593; G06T 2207/10016; G06T 2207/30196; G06T 2207/30252; G06T 7/246; G06T 13/20; G06T 13/40; G06T 2207/10012; G06T 2207/30248; G06T 2207/30261; G06T 2207/30256; G06T 7/215; G06T 7/55; G06T 7/70; G06T 2207/10048; G06T 7/0022; G06T 7/97; G06T 7/579; G06T 2200/24; G06T 2200/04; G06T 2207/10152; G06T 7/0014; G06T 2207/30244; G06T 2219/004; G06T 2207/10004; G06T 2207/20081; G06T 2207/10021; G06T 2207/30236; G06T 7/292; G06T 7/50; G06T 7/557; G06T 7/85; G06T 11/00; G06T 19/00; G06T 2207/30264; G06T 7/586; G06T 7/80; G06T 1/00; G06T 15/205; G06T 15/50; G06T 15/506; G06T 17/00; G06T 2207/10052; B60W 30/09; B60W 30/16; B60W 40/04; B60W 10/20; B60W 2050/146; B60T 2201/08; B60T 2210/32; B60T 2201/12; B60T 2201/024; B60T 2201/122; B60T 2201/10; B60T 2201/085; B60T 7/12; B60T 8/172; B60T 2201/02; B60T 8/321; B60T 2201/022; B60T 2250/04; H04B 10/116; H04B 10/1143; H04B 10/1141; H04B 10/60; H04B 10/54; H04B 10/40; H04B 10/50; H04W 4/50; H04W 4/80; H04W 4/21; H04W 4/02; H04W 48/04; H04W 4/029; H04W 4/40; G01S 17/931; G01S 17/89; G01S 17/86; G01S 17/42; G01S 7/4815; G01S 7/4817; G01S 13/931; G01S 17/894; G08G 1/00; G08G 1/167; G08G 1/09623; G08G 1/166; G08G 1/096725; G08G 1/0145; G08G 1/07; G08G 1/04; G08G 1/01; G08G 1/095; G08G 1/096; G08G 1/096791; G08G 1/142; G08G 1/144; G08G 1/147; G08G 1/0175; G08G 1/096716; G08G 1/165; G08G 1/205; G08G 1/164; G08G 1/0962; G08G 1/16; G08G 1/133; G08G 1/168; G08G 1/20; G08G 5/0013; G08G 5/0052; G08G 5/0091

See application file for complete search history.

(56) References Cited

U.S. PATENT DOCUMENTS

| | | | |
|---|---|---|---|
| 2013/0129150 A1* | 5/2013 | Saito | G06V 20/584 |
| | | | 382/104 |
| 2015/0138324 A1* | 5/2015 | Shirai | H04N 13/296 |
| | | | 348/47 |
| 2019/0025839 A1* | 1/2019 | Manjunath | G01S 11/12 |

* cited by examiner

VEHICLE EXTERNAL ENVIRONMENT RECOGNITION APPARATUS

CROSS-REFERENCE TO RELATED APPLICATIONS

This application claims priority from Japanese Patent Application No. 2020-139344 filed on Aug. 20, 2020, the entire contents of which are hereby incorporated by reference.

BACKGROUND

The disclosure relates to a vehicle external environment recognition apparatus that identifies a vehicle.

Techniques have been known that include detecting three-dimensional objects, e.g., vehicles, in front of an own vehicle to avoid contact with a preceding vehicle and/or making a control to keep a safe distance from the preceding vehicle. For example, reference is made to Japanese Patent No. 3349060. To provide such a control, techniques have been disclosed that include, for example, detecting lighting up of brake lamps on the basis of changes in luminance or changes in area of a predetermined detection region, to determine a deceleration state of a preceding vehicle. For example, reference is made to Japanese Patent No. 3872179.

SUMMARY

An aspect of the technology provides a vehicle external environment recognition apparatus including a light source extraction processor, a light source pair identification processor, a degree of reliability derivation processor, a light source pair re-identification processor, and a vehicle identification processor. The light source extraction processor is configured to extract light sources from an image. The light source pair identification processor is configured to identify a first pair of light sources on the basis of positional relation of the extracted light sources. The degree of reliability derivation processor is configured to derive a degree of vehicle reliability of the first pair of light sources. The degree of vehicle reliability indicates how reliably the first pair of light sources is regarded as belonging to the identical vehicle. On the condition that the degree of vehicle reliability of the first pair of light sources is lower than a predetermined re-identification threshold, the light source pair re-identification processor is configured to identify a second pair of light sources in the vicinity of the first pair of light sources having the degree of vehicle reliability lower than the re-identification threshold. The vehicle identification processor is configured to identify a vehicle on the basis of a position and the degree of vehicle reliability of the first pair of light sources identified by the light source pair identification processor, the second pair of light sources identified by the light source pair re-identification processor, or both.

An aspect of the technology provides a vehicle external environment recognition apparatus including circuitry. The circuitry is configured to extract light sources from an image. The circuitry is configured to identify a first pair of light sources on the basis of positional relation of the extracted light sources. The circuitry is configured to derive a degree of vehicle reliability of the first pair of light sources. The degree of vehicle reliability indicates how reliably the first pair of light sources is regarded as belonging to the identical vehicle. On the condition that the degree of vehicle reliability of the first pair of light sources is lower than a predetermined re-identification threshold, the circuitry is configured to identify a second pair of light sources in the vicinity of the first pair of light sources having the degree of vehicle reliability lower than the re-identification threshold. The circuitry is configured to identify a vehicle on the basis of a position and the degree of vehicle reliability of the first pair of light sources having the degree of vehicle reliability lower than the re-identification threshold, the second pair of light sources, or both.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
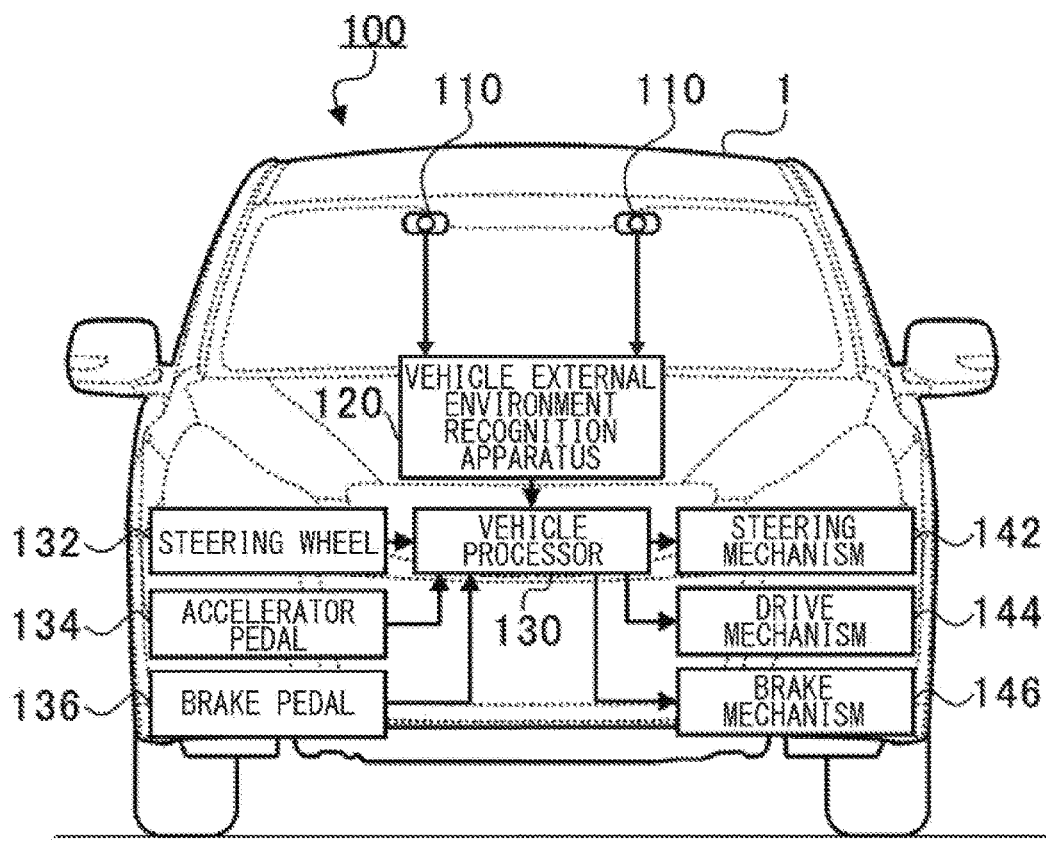
FIG. 1 is a block diagram illustrating an example of a coupling relationship in a vehicle external environment recognition system.

On night-time travel, images of vehicle external environment tend to have low luminance, causing difficulty in recognizing edges of objects. This may result in lowered precision of identification of a preceding vehicle. Accordingly, during night-time, an own vehicle not only makes the identification of a preceding vehicle itself on the basis of, for example, edges of the preceding vehicle, but also detects tail lamps or brake lamps for use in the identification of the preceding vehicle. Tail lamps and brake lamps are arranged in transverse symmetry on a rear surface of a preceding vehicle and are supposed to be level with each other and have an equal relative distance from an own vehicle. To identify a preceding vehicle, it is desirable not only to recognize each of the tail lamps and the brake lamps as a separate light source but also to recognize the tail lamps or the brake lamps as paired light sources. Paired light sources means light sources that constitute a pair, or a combination. Recognizing paired light sources makes it possible to attain enhanced precision of the identification of a preceding vehicle.

However, in some cases, two light sources that have been recognized as a pair are, in fact, tail lamps or brake lamps that belong to different vehicles. For example, there may be a case where a right tail lamp of a vehicle located on the left and a left tail lamp of a vehicle located on the right are erroneously recognized as paired light sources. In such a case, it takes long time for the identification of a preceding vehicle. Moreover, there arises possibility of erroneous recognition of an absent preceding vehicle, causing instable behavior of an own vehicle.

It is desirable to provide a vehicle external environment recognition apparatus that makes it possible to appropriately identify paired light sources.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

[Vehicle External Environment Recognition System 100]

FIG. 1 is a block diagram illustrating a coupling relationship in a vehicle external environment recognition system 100. The vehicle external environment recognition system 100 may include, for example but not limited to, imaging units 110, a vehicle external environment recognition apparatus 120, and a vehicle processor 130. The embodiment may include an example with the two imaging units 110 without limitation.

The imaging units 110 may each include an imaging device such as a charge-coupled device (CCD) and a complementary metal-oxide semiconductor (CMOS). The imaging units 110 may each perform imaging of an external environment in front of an own vehicle 1, and generate a luminance image. The luminance image may include at least luminance information, and be provided in the form of a color image or a monochrome image. The two imaging units 110 may be so disposed that their respective optical axes become substantially parallel to each other along a traveling direction of the own vehicle 1. The two imaging units 110 may be so disposed as to be separated away from each other in a substantially horizontal direction. The imaging units 110 may each continuously generate the luminance image for each frame of, for example but not limited to, 1/60 second, i.e., at a frame rate of 60 fps. The luminance image may include a capture of a three-dimensional object present in a detection region in front of the own vehicle 1.

The vehicle external environment recognition apparatus 120 may recognize vehicle external environment such as behavior of preceding vehicles and on-coming vehicles, and conditions of a travel path, through each of the two imaging units 110. On the basis of the vehicle external environment recognized, and on the basis of traveling states of the own vehicle 1, the vehicle external environment recognition apparatus 120 may make a speed control and a steering angle control on the travel of the own vehicle. The vehicle external environment recognition apparatus 120 is described later in detail.

The vehicle processor 130 may include, for example but not limited to, an electronic control unit (ECU). The vehicle processor 130 may receive an input of a driver's operation through a steering wheel 132, an accelerator pedal 134, and a brake pedal 136, and transmit the information of the input to a steering mechanism 142, a drive mechanism 144, and a brake mechanism 146, to control the own vehicle 1. The vehicle processor 130 may control the steering mechanism 142, the drive mechanism 144, and the brake mechanism 146 in accordance with an instruction given by the vehicle external environment recognition apparatus 120.

[Vehicle External Environment Recognition Apparatus 120]

Figure 2:
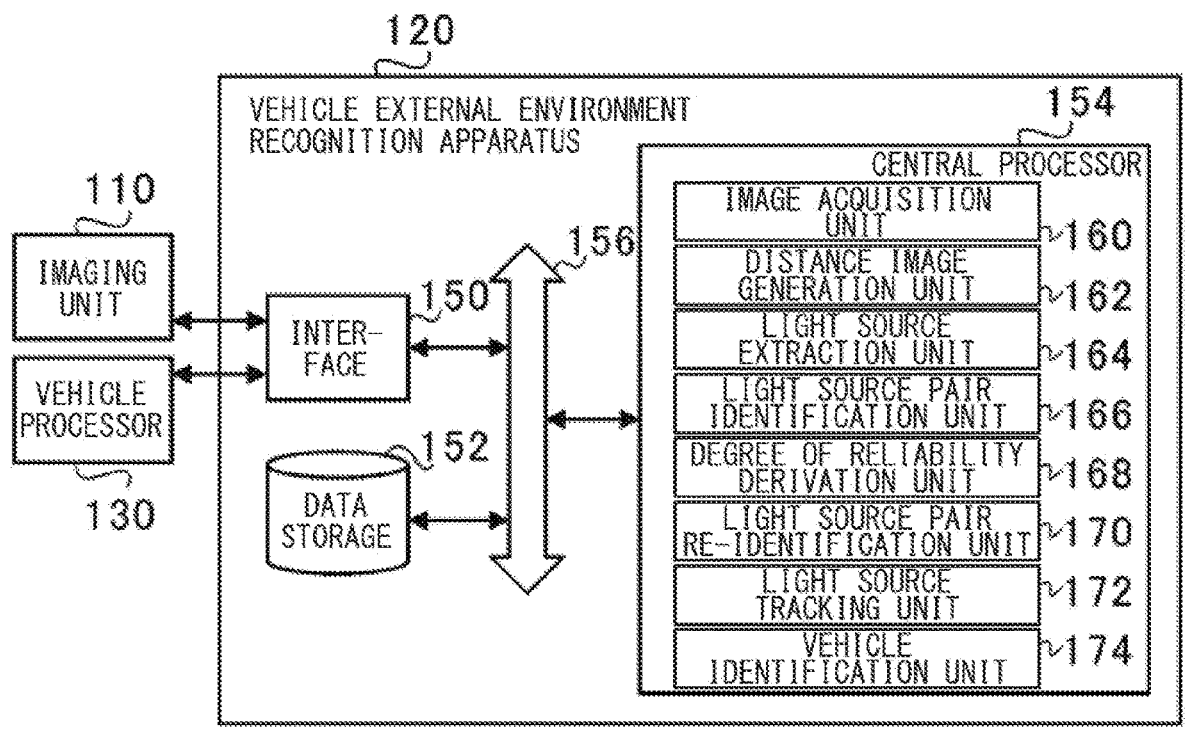
FIG. 2 is a block diagram illustrating an example of a schematic configuration of a vehicle external environment recognition apparatus.

FIG. 2 is a block diagram illustrating an example of a schematic configuration of the vehicle external environment recognition apparatus 120. As illustrated in FIG. 2, the vehicle external environment recognition apparatus 120 may include an interface 150, a data storage 152, and a central processor 154.

The interface 150 may allow for bi-directional information exchange between the vehicle external environment recognition apparatus 120 and each of the imaging units 110 and the vehicle processor 130. The data storage 152 may include, for example, a random access memory (RAM), a flash memory, and a hard disk drive (HDD). The data storage 152 may hold various pieces of information involved in processing to be performed by the units described below.

The central processor 154 may include a semiconductor integrated circuit including, for example but not limited to, a central processing unit (CPU), a read only memory (ROM), and a RAM. The ROM may hold, for example, programs. The RAM may serve as a work area. The central processor 154 may control, for example, the interface 150 and the data storage 152 through a system bus 156. In the embodiment, the central processor 154 may include an image acquisition unit 160, a distance image generation unit 162, a light source extraction unit 164, a light source pair identification unit 166, a degree of reliability derivation unit 168, a light source pair re-identification unit 170, a light source tracking unit 172, and a vehicle identification unit 174. In the following, a vehicle external environment recognition method is described in detail, together with operation of the subunits of the central processor 154.

[Vehicle External Environment Recognition Method]

Figure 3:
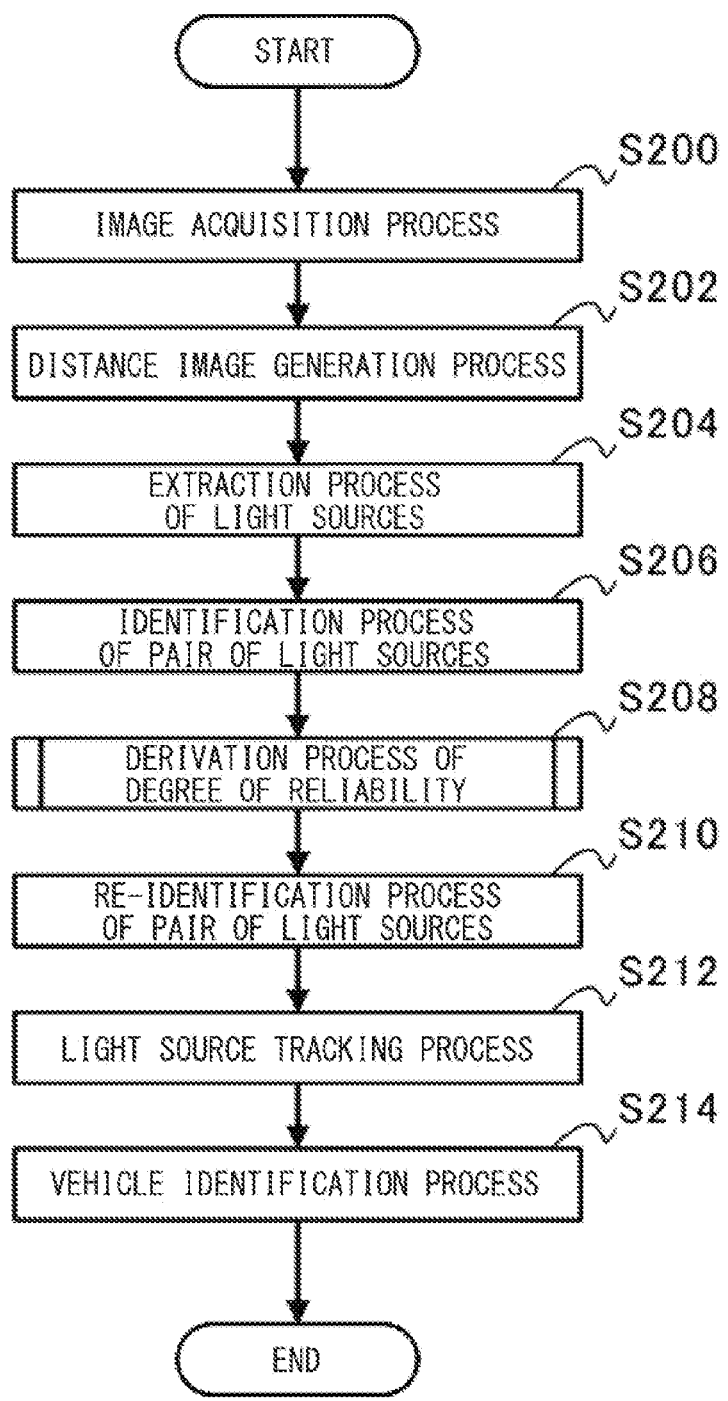
FIG. 3 is a flowchart illustrating an example of a flow of processes in a vehicle external environment recognition method.

FIG. 3 is a flowchart illustrating a flow of processes in the vehicle external environment recognition method. The processing in the flowchart may be repetitively executed every predetermined interruption time. In the vehicle external environment recognition method, first, the image acquisition unit 160 may acquire a plurality of the luminance images (S200). Thereafter, the distance image generation unit 162 may generate a distance image (S202). Thereafter, the light source extraction unit 164 may extract light sources from the luminance image (S204). Thereafter, the light source pair identification unit 166 may identify a pair of light sources on the basis of positional relation of the extracted light sources (S206). Thereafter, the degree of reliability derivation unit 168 may derive a degree of vehicle reliability (S208). The degree of vehicle reliability indicates how reliably the pair of light sources is regarded as belonging to the identical vehicle. Thereafter, on the condition that the degree of vehicle reliability of the pair of light sources is lower than a predetermined re-identification threshold, the light source pair re-identification unit 170 may identify an additional pair of light sources in the vicinity of the pair of light sources having the degree of vehicle reliability lower than the re-identification threshold (S210). Thereafter, the light source tracking unit 172 may track each of the pairs of light sources identified (S212). Thereafter, the vehicle identification unit 174 may identify a vehicle on the basis of a position and the degree of vehicle reliability of the pair of light sources identified by the light source pair identification unit 166, the additional pair of light sources identified by the light source pair re-identification unit 170, or both (S214). In the following, each process of the vehicle external environment recognition method is described in detail.

[Image Acquisition Process S200]

Figure 4A:
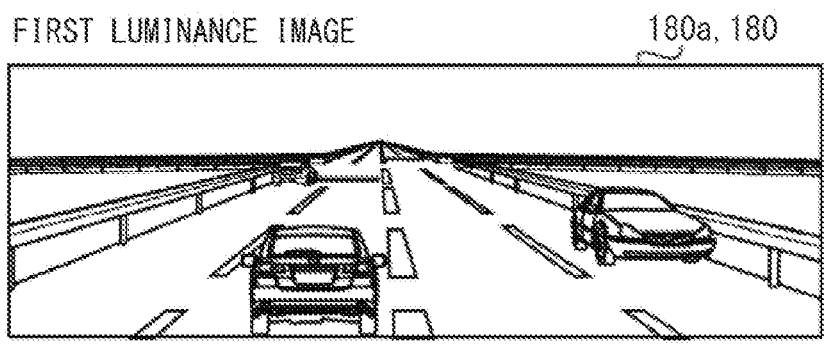
FIGS. 4A, 4B, and 4C describe examples of luminance images and a distance image.
Figure 4B:
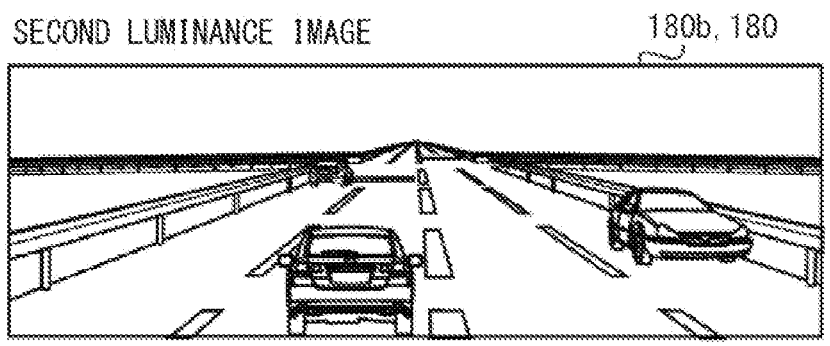
Figure 4C:
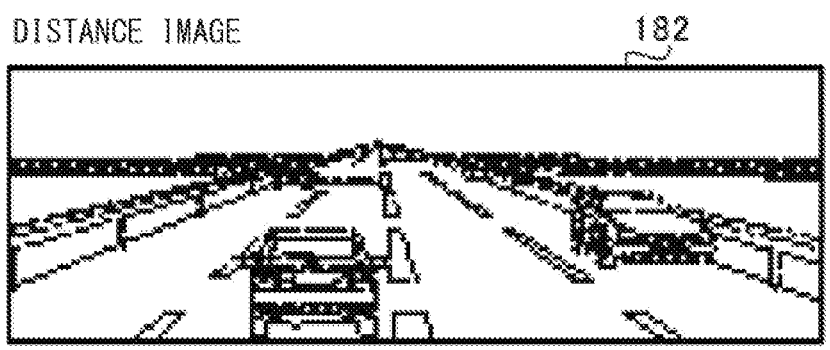

FIGS. 4A, 4B, and 4C illustrate examples of luminance images and a distance image. The image acquisition unit 160 may acquire a plurality of the luminance images, e.g., the two luminance images in the embodiment. The plurality of the luminance images is captured by the imaging units 110 having differently-oriented optical axes. Let us assume that the image acquisition unit 160 acquires, as luminance images 180, a first luminance image 180*a* as illustrated in FIG. 4A and a second luminance image 180*b* as illustrated in FIG. 4B. The first luminance image 180*a* may be captured by the imaging unit 110 located on the relatively right side of the own vehicle 1. The second luminance image 180*b* may be captured by the imaging unit 110 located on the relatively left side of the own vehicle 1.

Referring to FIGS. 4A and 4B, the imaging units 110 capture images at different positions, causing a difference in horizontal positions of a three-dimensional object in the first luminance image 180*a* and the second luminance image 180*b*. The term horizontal refers to a transverse direction in an image captured. The term vertical refers to a longitudinal direction in the image captured.

[Distance Image Generation Process S202]

The distance image generation unit 162 may generate a distance image 182 as illustrated in FIG. 4C, on the basis of the first luminance image 180*a* illustrated in FIG. 4A and the second luminance image 180*b* illustrated in FIG. 4B. The first luminance image 180*a* and the second luminance image 180*b* may be acquired by the image acquisition unit 160.

In one example, the distance image generation unit 162 may derive parallax information with respect to all blocks displayed in the detection region, with the use of so-called pattern matching. The parallax information includes parallax, and an image position indicating where any block is positioned in an image. A block is represented by, for example, an array of 4 pixels horizontally by 4 pixels vertically. The pattern matching includes searching one of the luminance images for a corresponding block to any block extracted from another of the luminance images. Thereafter, the distance image generation unit 162 may convert the parallax information in units of blocks in the distance image 182 into three-dimensional positional information with the use of a so-called stereo method, to derive a relative distance of the relevant block to the own vehicle 1. The stereo method is a method of deriving, from the parallax of a three-dimensional object, a relative distance of the relevant three-dimensional object to the imaging units 110 with the use of triangulation.

[Extraction Process of Light Sources S204]

Thus, the first luminance image 180*a* and the second luminance image 180*b* are acquired, and the distance image 182 is generated. Thereupon, a three-dimensional object such as a preceding vehicle is identified on the basis of luminance in the first luminance image 180*a* and the second luminance image 180*b*, and on the basis of the relative distance to the own vehicle 1 in the distance image 182.

In the meanwhile, for example, on night-time travel, the first luminance image 180*a* and the second luminance image 180*b* tend to have low luminance. This is accompanied by lowered precision of identification of the relative distance to the own vehicle 1 in the distance image 182. Accordingly, during night-time, the vehicle external environment recognition apparatus 120 is configured not only to make the identification of a preceding vehicle itself but also to detect tail lamps or brake lamps for use in the identification of a preceding vehicle.

Tail lamps and brake lamps are arranged in transverse symmetry arranged on a rear surface of a preceding vehicle and are supposed to be level with each other and have an equal relative distance from the own vehicle 1. To identify a preceding vehicle, the vehicle external environment recognition apparatus 120 is configured not only to recognize each of the tail lamps and the brake lamps as a separate light source but also to make paring of the light sources to recognize the light sources as paired light sources.

In one example, the light source extraction unit 164 may perform grouping of blocks. The grouping may be made with the use of luminance values based on the luminance images 180, and with the use of the three-dimensional positional information in real space. The positional information may be calculated on the basis of the distance image 182, and include the relative distance to the own vehicle 1. The blocks to be grouped may have equal color values, and have the three-dimensional positional information indicating that the blocks are close to one another.

Figure 5A:
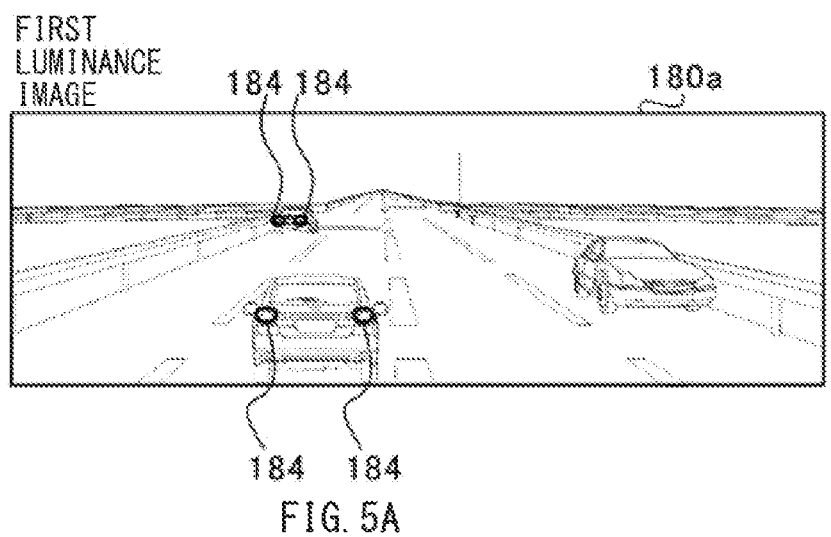
FIGS. 5A and 5B describe an example of paring of light sources.
Figure 5B:
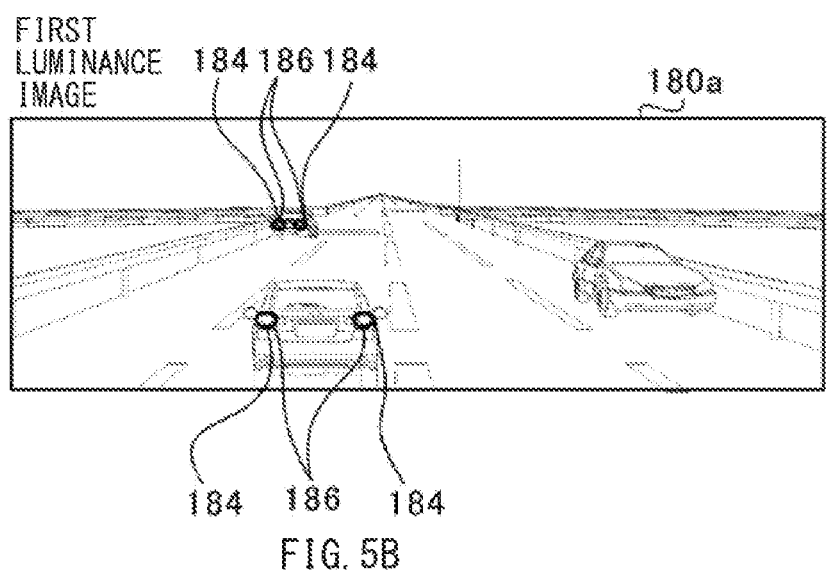

FIGS. 5A and 5B illustrate an example of the paring of the light sources 184. As illustrated in FIG. 5A, the light source extraction unit 164 may extract, from one of the plurality of the luminance images 180, e.g., the first luminance image 180*a*, the separate light sources 184 having luminance and color distribution corresponding to the tail lamp or the brake lamp.

In a case where luminance of the light sources 184 is too high, the imaging units 110 may generate the luminance images 180 with shortened exposure time. Alternatively, the imaging units 110 may alternately generate the luminance images 180 with exposure time of a plurality of different durations, and the light source extraction unit 164 may extract the light sources 184 on the basis of the luminance and the color distribution, from whichever of the luminance images 180 is generated with the relatively shorter exposure time.

Even in a case where grouped blocks are recognized as the light source 184 on the basis of the luminance and the color distribution, the light source extraction unit 164 may exclude, from presumed tail lamps and presumed brake lamps, whichever light source 184 lacks the distance in the distance image 182 or has the distance unidentifiable in the distance image 182. It is to be noted that a reflector as a three-dimensional object is sometimes similar to the tail lamps and the brake lamps in terms of its luminance and color distribution. Even in a case where grouped blocks are recognized as the light source 184 on the basis of the luminance and the color distribution, the light source extraction unit 164 may exclude, from the presumed tail lamps and the presumed brake lamps, whichever light source 184 has predetermined sizes and shapes, e.g., a reflector.

[Identification Process of Pair of Light Sources S206]

The light source pair identification unit 166 may refer to the distance image 182 and identify a pair of light sources 186 having positional relation of the tail lamps or the brake lamps, on the basis of positional relation of whichever light sources 184 are not excluded from the presumed tail lamps and the presumed brake lamps.

In one example, the light source pair identification unit 166 may accumulate points of any two light sources 184 for each of the following four conditions: (1) a horizontal distance, or a width, is equal to or smaller than a regulatory vehicle length; (2) pixels overlap vertically; (3) a difference in the relative distance falls within a predetermined range;

and (4) a difference in area falls within a predetermined range. In a case where the number of the points of the two light sources 184 is equal to or greater than a predetermined threshold, the light source pair identification unit 166 may identify the relevant combination of the two light sources 184 as the pair of light sources 186. For example, in the example in FIG. 5B, two pairs of the light sources 184 may be identified as the pairs of light sources 186.

In this embodiment, recognizing the light sources 184, i.e., the presumed tail lamps or the presumed brake lamps, as the pair of light sources 186 makes it possible to attain enhanced precision of the identification of a preceding vehicle.

Figure 6:
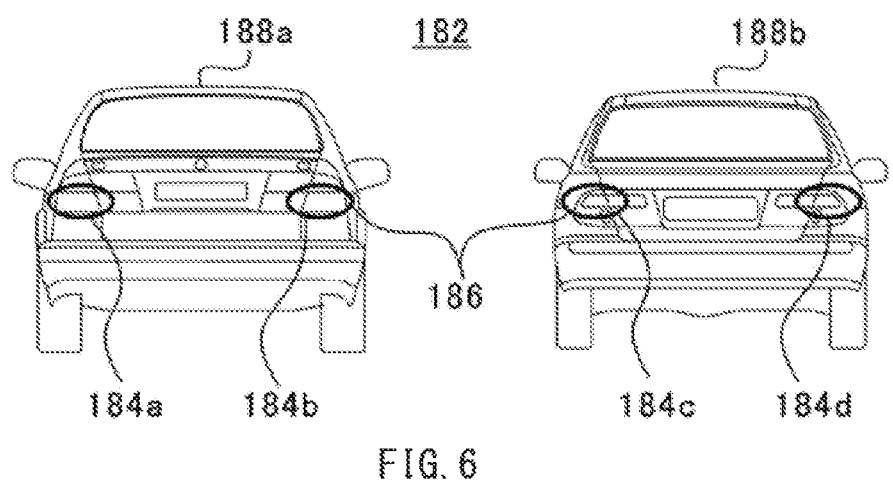
FIG. 6 describes a concern about the paring.

FIG. 6 describes a concern about the paring. For example, let us assume that in the distance image 182 illustrated in FIG. 6, two preceding vehicles 188a and 188b are traveling side by side, with the relative distances to the own vehicle 1 being substantially equal. In this case, a left light source 184a of the left preceding vehicle 188a and a right light source 184b of the preceding vehicle 188a should be identified as a pair of light sources. Likewise, a left light source 184c of the right preceding vehicle 188b and a right light source 184d of the preceding vehicle 188b should be identified as a pair of light sources.

However, in some cases, the right light source 184b of the left preceding vehicle 188a and the left light source 184c of the right preceding vehicle 188b may gain many points for the conditions (1) to (4) described above. This contributes to erroneous recognition of the light sources 184b and 184c as the pair of light sources 186. In such a case, it takes long time for the identification of a preceding vehicle. Moreover, there arises possibility of erroneous recognition of an absent preceding vehicle, causing instable behavior of the own vehicle 1.

Thus, in this embodiment, a degree of vehicle reliability is derived. The degree of vehicle reliability indicates how reliably the pair of light sources 186 are regarded as belonging to the identical vehicle. On the basis of the degree of vehicle reliability, the pair of light sources 186 is appropriately identified.

[Derivation Process of Degree of Reliability S208]

Figure 7:
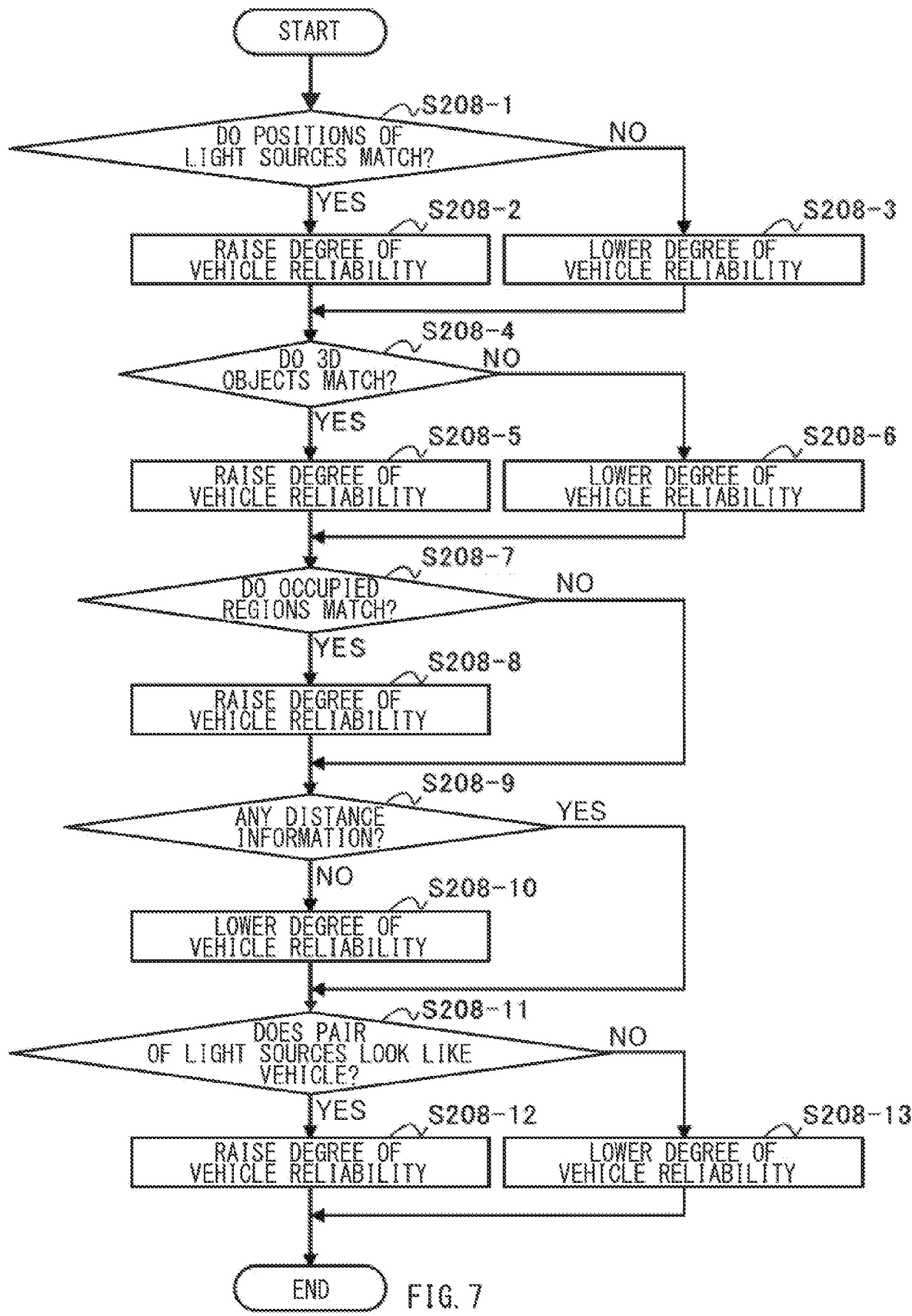
FIG. 7 is a flowchart illustrating an example of a flow of a derivation process of a degree of reliability.

FIG. 7 is a flowchart illustrating a flow of a derivation process of the degree of reliability S208. The degree of reliability derivation unit 168 may derive the degree of vehicle reliability of the pair of light sources 186. For example, as illustrated in FIG. 7, first, the degree of reliability derivation unit 168 may update the degree of vehicle reliability of the pair of light sources 186 on the basis of a result of tracking of the pair of light sources 186 tracked by the light source tracking unit 172 described later.

In one example, the degree of reliability derivation unit 168 may acquire a position, in a next frame, of the pair of light sources 186 predicted on the basis of a position, a speed, and a rotation speed, in a previous frame, of the pair of light sources 186 being tracked by the light source tracking unit 172, and on the basis of an amount of movement of the own vehicle 1. In a case where the position of the predicted pair of light sources 186 and a position of the actually identified pair of light sources 186 match, the degree of reliability derivation unit 168 may raise the degree of vehicle reliability. In a case where the position of the predicted pair of light sources 186 and the position of the actually identified pair of light sources 186 differ, the degree of reliability derivation unit 168 may lower the degree of vehicle reliability.

For example, the degree of reliability derivation unit 168 may determine whether or not the positions of the two light sources 184 constituting the predicted pair of light sources 186 and the positions of the two light sources 184 constituting the actually identified pair of light sources 186 match (S208-1). In a case where both of the positions of the two light sources 184 constituting the predicted pair of light sources 186 match respective ones of the positions of the two light sources 184 constituting the actually identified pair of light sources 186 (YES in S208-1), the degree of reliability derivation unit 168 may raise the degree of vehicle reliability (S208-2). In a case where only one of the positions of the two light sources 184 constituting the predicted pair of light sources 186 matches a corresponding one of the positions of the two light sources 184 constituting the actually identified pair of light sources 186, or in a case where both of the positions of the two light sources 184 constituting the predicted pair of light sources 186 fails to match respective ones of the positions of the two light sources 184 constituting the actually identified pair of light sources 186 (NO in S208-1), the degree of reliability derivation unit 168 may lower the degree of vehicle reliability (S208-3).

Thereafter, the degree of reliability derivation unit 168 may determine whether or not a three-dimensional object with which the predicted pair of light sources 186 are associated, e.g., a preceding vehicle, and a three-dimensional object with which the actually identified pair of light sources 186 are associated match (S208-4). In a case where the three-dimensional objects match (YES in S208-4), the degree of reliability derivation unit 168 may raise the degree of vehicle reliability (S208-5). In a case where the three-dimensional objects fail to match (NO in S208-4), the degree of reliability derivation unit 168 may lower the degree of vehicle reliability (S208-6).

Thereafter, the degree of reliability derivation unit 168 may determine whether or not a horizontally occupied region of the pair of light sources 186 of the presumed tail lamps identified this time and a horizontally occupied region of the pair of light sources 186 of the presumed brake lamps identified this time match (S208-7). In a case where the occupied regions match (YES in S208-7), the degree of reliability derivation unit 168 raise the degree of vehicle reliability (S208-8).

Thereafter, the degree of reliability derivation unit 168 may determine presence or absence of distance information regarding an intermediate region between the two light sources 184 constituting the pair of light sources 186 identified this time, or whether or not the relative distance of the intermediate region is greater than the relative distance of the pair of light sources 186 by a predetermined distance or more (S208-9). In short, the degree of reliability derivation unit 168 may determine presence or absence of a portion corresponding to a rear surface of a preceding vehicle. In a case with the absence of the distance information regarding the intermediate region, or in a case where the relative distance regarding the intermediate region is greater than the relative distance of the pair of light sources 186 by the predetermined distance or more (NO in S208-9), the degree of reliability derivation unit 168 may lower the degree of vehicle reliability (S208-10).

Thereafter, the degree of reliability derivation unit 168 may determine whether or not the pair of light sources 186 identified this time belongs to a vehicle (S208-11). The determination may be made with the use of an unillustrated machine learning device that have machine learned vehicle likeliness in advance. In a case with a determination that the pair of light sources 186 identified this time looks like a vehicle (YES in S208-11), the degree of reliability derivation unit 168 may raise the degree of vehicle reliability (S208-12). In a case with a determination that the pair of light sources 186 identified this time does not look like a vehicle (NO in S208-11), the degree of reliability derivation unit 168 may lower the degree of vehicle reliability (S208-13). Thus, the degree of vehicle reliability is derived. It is to be noted that as to the machine learning device, a plurality of existing techniques has been disclosed, and detailed description thereof is omitted here.

As described, the degree of reliability derivation unit 168 may update the degree of vehicle reliability of the pair of light sources 186. Thus, as described with reference to FIG. 6, even in a case where the light sources 184 belonging to the different preceding vehicles 188a and 188b are erroneously identified as the pair of light sources 186, the degree of vehicle reliability of the erroneously identified pair of light sources 186 is lowered eventually and excluded from the pairs of light sources 186. However, once such light sources 184 are recognized as the pair of light sources 186, it may take time until the degree of vehicle reliability becomes sufficiently low. Accordingly, in this embodiment, in a case where the degree of vehicle reliability of the pair of light sources 186 is lowered, erroneous recognition of the pair of light sources 186 may be assumed, and search may be made for an additional pair of light sources 186 in the vicinity of the erroneously recognized pair of light sources 186.

[Re-Identification Process of Pair of Light Sources S210]

In a case where the degree of vehicle reliability of the pair of light sources 186 is lower than a predetermined re-identification threshold, the light source pair re-identification unit 170 may identify the additional pair of light sources 186 in the vicinity of the pair of light sources 186 having the degree of vehicle reliability lower than the re-identification threshold. The light source pair re-identification unit 170 may identify the additional pair of light sources 186 on the basis of, for example, positional relation any one of remainder of the light sources 184 to one of the light sources 184 in the pair of light sources 186 having the degree of vehicle reliability lower than the re-identification threshold.

Figure 8:
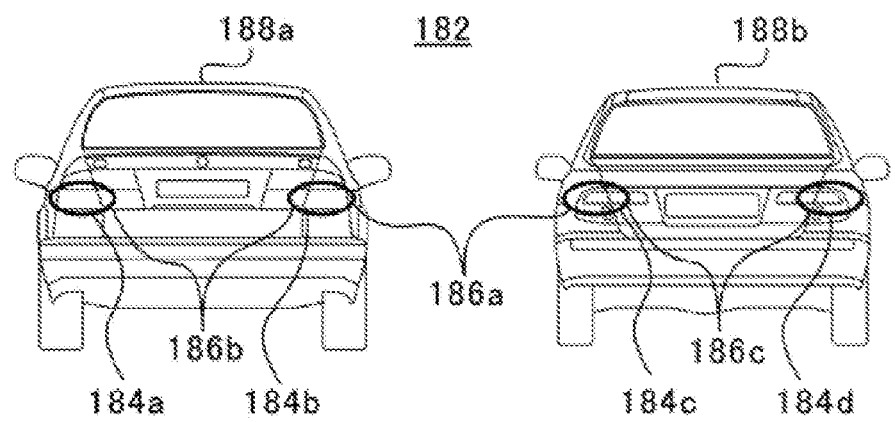
FIG. 8 describes an example of operation of a light source pair re-identification processor.

FIG. 8 describes an example of operation of the light source pair re-identification unit 170. In the example of FIG. 8, let us assume that the light source 184b and the light source 184c are erroneously identified as a pair of light sources 186a. However, the pair of light sources 186a should not have been identified as the pair of light sources 186, and the degree of vehicle reliability of the pair of light sources 186a is gradually lowered.

The degree of vehicle reliability of the pair of light sources 186a is lowered enough to become lower than the predetermined re-identification threshold. Thereupon, the light source pair re-identification unit 170 may give an attempt of pairing of a first one of the light sources 184 in the pair of light sources 186a, e.g., the light source 184b, with any one of the remainder of the light sources 184 except for the light source 184c as a second one of the light sources 184 in the pair of light sources 186a, e.g., the light source 184a.

As with the light source pair identification unit 166, the light source pair re-identification unit 170 may accumulate points of the light sources 184b and 184a for each of the following four conditions: (1) the horizontal distance, or the width, is equal to or smaller than the regulatory vehicle length; (2) pixels overlap vertically; (3) the difference in the relative distance falls within the predetermined range; and (4) the difference in area falls within the predetermined range. In a case where the number of the points of the light sources 184b and 184a is greater than the predetermined threshold, the light source pair re-identification unit 170 may identify the combination of the light sources 184b and 184a as an additional pair of light sources 186b.

Moreover, the light source pair re-identification unit 170 may give another attempt of pairing of the second one of the light sources 184 in the pair of light sources 186a, e.g., the light source 184c, with any one of the remainder of the light sources 184 except for the light source 184b as the first one of the light sources 184 in the pair of light sources 186a, e.g., the light source 184d. As with the light source 184b, the light source pair re-identification unit 170 may accumulate points of the light sources 184c and 184d for each of the four conditions (1) to (4) as mentioned above. In a case where the number of the points of the light sources 184c and 184d is greater than the predetermined threshold, the light source pair re-identification unit 170 may identify the combination of the light sources 184c and 184d as an additional pair of light sources 186c.

In the forgoing description, the additional pairs of light sources 186b and 186c are identified, but the degrees of vehicle reliability of the additional pairs of light sources 186b and 186c do not have to be immediately derived. Instead, in the next frame, the degrees of vehicle reliability of the additional pairs of light sources 186b and 186c may be updated, together with those of the other pairs of light sources 186. One reason for this may be as follows. If the additional pairs of light sources 186b and 186c should be identified as the pair of light sources 186, the degrees of vehicle reliability of the additional pairs of light sources 186b and 186c are eventually raised by repeating the vehicle external environment recognition method as described above. It is to be noted that in one alternative, the degree of reliability derivation unit 168 may derive the degree of vehicle reliability solely for the additional pairs of light sources 186b and 186c after the re-identification process of the pair of light sources S210.

Moreover, in the forgoing description, a decrease in the degree of vehicle reliability of the pair of light sources 186a triggers the identification of the additional pairs of light sources 186b and 186c in the vicinity of the pair of light sources 186a. However, this does not entail immediate elimination of the original pair of light sources 186a. At this stage, the intention is increasing the number of the presumed pairs of light sources 186 because the degree of vehicle reliability of the pair of light sources 186a is low, and no determination has been made yet that the pair of light sources 186a is unsuitable for the pair of light sources 186. Accordingly, in subsequent processing, all of the pairs of light sources 186a, 186b, and 186c are subject to the processes as the presumed pairs of light sources 186.

Furthermore, the forgoing description is given of the example where, in the case where the degree of vehicle reliability of the pair of light sources 186 is lower than the re-identification threshold, the additional pair of light sources 186 is identified on the basis of the positional relation to one of the light sources 184 in the pair of light sources 186 having the degree of vehicle reliability lower than the re-identification threshold. However, this case is non-limiting. Because the degree of vehicle reliability of the pair of light sources 186 is low, there is high possibility of presence of the light source 184 that should constitute the pair of light sources 186 in the vicinity thereof. Accordingly, the additional pair of light sources 186 may be identified in the vicinity of the pair of light sources 186 having the degree of vehicle reliability lower than the re-identification threshold.

[Light Source Tracking Process S212]

The light source tracking unit 172 may track the pairs of light sources 186 identified by the light source pair identification unit 166 and the light source pair re-identification unit 170. The tracking may be carried out on the basis of speeds and rotation speeds of the pairs of light sources 186, and on the basis of the amount of movement of the own vehicle 1. In a case where any one of the pairs of light sources 186 as a target has been detected in the previous frame and already tracked, the light source tracking unit 172 may correlate the relevant pair of light sources 186 to the pair of light sources 186 in the previous frame, in accordance with a rate at which pixels of the pairs of light sources 186 overlap, and a degree of similarity of the distance.

Moreover, in a case where the degree of vehicle reliability becomes lower than a predetermined lower limit threshold lower than the re-identification threshold as mentioned above, the light source tracking unit 172 may exclude the relevant pair of light sources 186 from the targets of tracking. For example, in the example of FIG. 8, the light source 184b and the light source 184c are erroneously identified as the pair of light sources 186a. Repeating the vehicle external environment recognition method as described above causes the degree of vehicle reliability of the pair of light sources 186a to lower eventually. Thus, the pair of light sources 186a having the degree of vehicle reliability lower than the lower limit threshold is excluded from the targets of tracking by the light source tracking unit 172, and the appropriate pairs of light sources 186b and 186c remain.

[Vehicle Identification Process S214]

Figure 9:
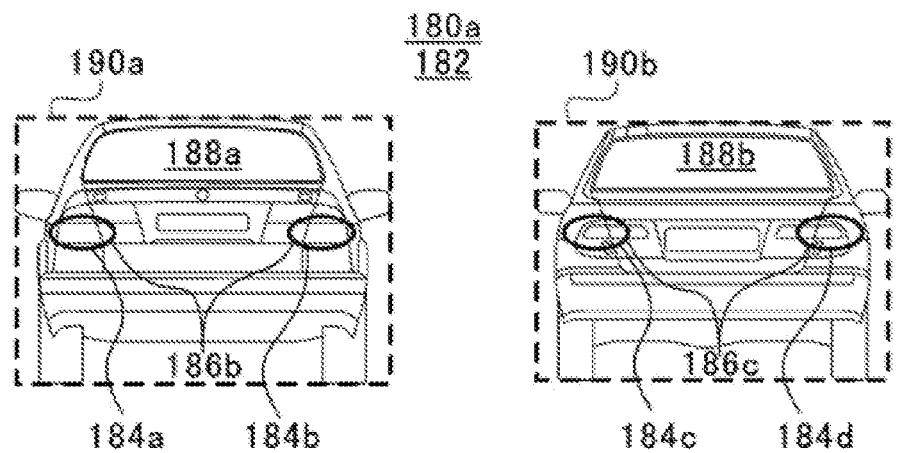
FIG. 9 describes an example of a vehicle identification process.

FIG. 9 describes an example of a vehicle identification process. First, the vehicle identification unit 174 may perform grouping of blocks, in the distance image 182, as a three-dimensional object. The blocks to be grouped may include whichever blocks have the equal relative distance to the own vehicle 1 and are close to one another horizontally and vertically, out of a plurality of blocks located in a heightwise range of a predetermined distance or greater from a road surface. Thereafter, the vehicle identification unit 174 may identify, as a three-dimensional object in the first luminance image 180a, a region in the first luminance image 180a corresponding to a region identified as a three-dimensional object in the distance image 182. It is to be noted that in FIG. 9, the distance image 182 and the first luminance image 180a are superimposed, to illustrate relation of regions occupied by three-dimensional objects. The vehicle identification unit 174 may identify rectangular regions in the first luminance image 180a as three-dimensional object regions 190a and 190b. The rectangular regions each include a whole three-dimensional object. Here, a rectangle is formed by two vertically extending straight lines in contact with left and right edges of the three-dimensional object and two horizontally extending straight lines in contact with upper and lower edges of the three-dimensional object.

On the basis of positional relation of the three-dimensional object regions 190a and 190b thus formed and the pairs of light sources 186b and 186c having the degrees of vehicle reliability equal to or higher than a predetermined suitability threshold for determining whether the three-dimensional object can suitably be regarded as a vehicle, the vehicle identification unit 174 may identify the three-dimensional objects inside the three-dimensional object regions 190a and 190b as the preceding vehicles 188a and 188b as specific objects. In one example, the vehicle identification unit 174 may identify the three-dimensional object inside the three-dimensional object region 190a as the preceding vehicle 188a in a case where a horizontal width and a height of the three-dimensional object region 190a correspond to those of a vehicle, a difference in the relative distance between the three-dimensional object region 190a and the pair of light sources 186b having the degree of vehicle reliability equal to or higher than the predetermined suitability threshold falls within a predetermined range, and the pair of light sources 186b having the degree of vehicle reliability equal to or higher than the predetermined suitability threshold is positioned at an appropriate level inside the three-dimensional object region 190a. Likewise, the vehicle identification unit 174 may identify the three-dimensional object inside the three-dimensional object region 190b as the preceding vehicle 188b in a case where a horizontal width and a height of the three-dimensional object region 190b correspond to those of a vehicle, a difference in the relative distance between the three-dimensional object region 190b and the pair of light sources 186c having the degree of vehicle reliability equal to or higher than the predetermined suitability threshold falls within the predetermined range, and the pair of light sources 186c having the degree of vehicle reliability equal to or higher than the predetermined suitability threshold is positioned at an appropriate level inside the three-dimensional object region 190b.

In this way, the three-dimensional object regions 190a and 190b are identified as the preceding vehicles 188a and 188b. This makes it possible for the vehicle external environment recognition apparatus 120 to avoid contact with the preceding vehicle 188a or 188b, and/or to control the own vehicle 1 to maintain the safe distances from the preceding vehicles 188a and 188b.

As described, in the embodiment, identifying the additional pair of light sources 186 in the vicinity of the pair of light sources 186 having the lowered degree of vehicle reliability makes it possible to identify the preceding vehicles 188a and 188b quickly and stably even in the case with the erroneous recognition of the pair of light sources 186. Hence, it is possible to avoid lowered precision of identification of preceding vehicles and a delay in the speed control with respect to the preceding vehicles.

There are also provided a program that causes a computer to serve as the vehicle external environment recognition apparatus 120, and a computer-readable recording medium that holds the program. Non-limiting examples of the recording medium may include a flexible disk, a magneto-optical disk, a ROM, a CD (compact disk), a DVD (digital versatile disk), and a BD (blue ray disk). Here, the program means a data processor described in any language or description method.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

It is to be noted that processes of the vehicle external environment recognition method herein do not have to be processed in the order described in the flowchart, but may include parallel processing or sub-routine processing.

According to the embodiments of the technology, it is possible to appropriately identify paired light sources.

The vehicle external environment recognition apparatus 120 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle external environment recognition apparatus 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle external environment recognition apparatus 120 illustrated in FIG. 1.

The invention claimed is:

1. A vehicle external environment recognition apparatus, comprising:
   a light source extraction processor configured to extract light sources from an image;
   a light source pair identification processor configured to identify a first pair of light sources on a basis of positional relation of the extracted light sources;
   a degree of reliability derivation processor configured to derive a degree of vehicle reliability of the first pair of light sources, the degree of vehicle reliability indicating how reliably the first pair of light sources is regarded as belonging to an identical vehicle;
   a light source pair re-identification processor configured to identify, on a condition that the degree of vehicle reliability of the first pair of light sources is lower than a predetermined re-identification threshold, a second pair of light sources in vicinity of the first pair of light sources having the degree of vehicle reliability lower than the re-identification threshold; and
   a vehicle identification processor configured to identify a vehicle on a basis of a position and the degree of vehicle reliability of the first pair of light sources identified by the light source pair identification processor, the second pair of light sources identified by the light source pair re-identification processor, or both.

2. The vehicle external environment recognition apparatus according to claim 1, wherein
   the light source pair re-identification processor is configured to identify the second pair of light sources on a basis of positional relation of any one of remainder of the extracted light sources to one of the first pair of light sources having the degree of vehicle reliability lower than the re-identification threshold.

3. A vehicle external environment recognition apparatus, comprising
   circuitry configured to:
   extract light sources from an image;
   identify a first pair of light sources on a basis of positional relation of the extracted light sources;
   derive a degree of vehicle reliability of the first pair of light sources, the degree of vehicle reliability indicating how reliably the first pair of light sources is regarded as belonging to an identical vehicle;
   identify, on a condition that the degree of vehicle reliability of the first pair of light sources is lower than a predetermined re-identification threshold, a second pair of light sources in vicinity of the first pair of light sources having the degree of vehicle reliability lower than the re-identification threshold; and
   identify a vehicle on a basis of a position and the degree of vehicle reliability of the first pair of light sources having the degree of vehicle reliability lower than the re-identification threshold, the second pair of light sources, or both.

* * * * *